(12) United States Patent
Shinkai

(10) Patent No.: US 6,635,358 B2
(45) Date of Patent: Oct. 21, 2003

(54) COMPOSITE MEMBER COMPRISING BONDED DIFFERENT MEMBERS AND METHOD FOR MAKING THE COMPOSITE MEMBER

(75) Inventor: Masayuki Shinkai, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 13 days.

(21) Appl. No.: 09/908,951

(22) Filed: Jul. 19, 2001

(65) Prior Publication Data

US 2002/0038813 A1 Apr. 4, 2002

(30) Foreign Application Priority Data

Jul. 27, 2000 (JP) .......................... 2000-227291
Aug. 1, 2000 (JP) .......................... 2000-233247

(51) Int. Cl.⁷ .................. B23K 35/24; B32B 15/04; C09J 9/02
(52) U.S. Cl. .................. 428/621; 428/627; 428/632; 428/666; 428/672; 428/678; 228/262.21
(58) Field of Search .................. 428/621, 627, 428/632, 672, 666, 678; 228/262.21

(56) References Cited

U.S. PATENT DOCUMENTS

| | | | | |
|---|---|---|---|---|
| 5,079,223 A | * | 1/1992 | Maroni ................... | 505/473 |
| 5,108,025 A | * | 4/1992 | Kang et al. ................ | 228/124.7 |
| 5,325,012 A | * | 6/1994 | Sato et al. ................ | 310/364 |
| 5,598,966 A | * | 2/1997 | Romano et al. ......... | 228/124.6 |
| 5,998,041 A | * | 12/1999 | Makino et al. ............. | 428/621 |
| 6,078,028 A | * | 6/2000 | Cooper et al. ............. | 219/270 |
| 6,348,273 B1 | * | 2/2002 | Ishikawa et al. ........... | 428/621 |
| 6,440,578 B1 | * | 8/2002 | Shinkai et al. ............. | 428/548 |

FOREIGN PATENT DOCUMENTS

| | | |
|---|---|---|
| EP | 0 945 414 A2 | 9/1999 |
| GB | 979811 | 1/1965 |
| JP | 10-209255 | 8/1998 |
| JP | 11-278951 | 10/1999 |

* cited by examiner

Primary Examiner—John J. Zimmerman
Assistant Examiner—Jason Savage
(74) Attorney, Agent, or Firm—Burr & Brown

(57) ABSTRACT

A composite member includes a ceramic base and a metallic member which are bonded to each other. An active metal foil is disposed on the surface of the ceramic base and a solder material including Au or a solder material including an Au—Ag alloy is disposed on the active metal foil. The active metal foil and the solder material are heated to form a bonding layer and the metallic member is disposed on the surface of the bonding layer, and these are pressed and heated to bond the bonding layer and the metallic member through solid phase bonding. Since in this composite member the bonding layer and the metallic member are bonded by solid phase bonding, the composite members can be effectively inhibited from breakage caused by residual stress at the time of bonding and, moreover, is excellent in thermal cycle characteristics and thermal shock characteristics.

10 Claims, 9 Drawing Sheets

50 μm

COMPOSITE MEMBER COMPRISING BONDED DIFFERENT MEMBERS AND METHOD FOR MAKING THE COMPOSITE MEMBER

FIELD OF THE INVENTION AND RELATED ART

The present invention relates to a composite member comprising different members bonded to one another, and more particularly to a composite member comprising different members bonded using a specific solder material through solid phase bonding, and a method for making the composite member.

There is a method of using a solder material for bonding different members, for example, a ceramic base and a metallic member. However, during cooling operation in bonding them at high temperatures, thermal stress is generated owing to the differences in thermal expansion coefficients between the different members or between the member and the solder material used for bonding these different members. Different thermal expansion coefficients between the members can cause separation at the bonded interface, or if one of the members is fragile, cracks occur in the vicinity of the bonded interface and sometimes the desired bonding strength or airtightness cannot be obtained. The products in which these defects are caused during the production steps must be disposed of as rejected products, and this results in an increase of the production cost of these composite members. Moreover, if they are subjected to thermal cycles in use, the defects occur after use of a certain period to cause deterioration of reliability of the products.

When different members are bonded using a solder material, a method is generally employed according to which the surface of the ceramic base to be bonded is plated with a metal such as Ni to ensure wetting between the ceramic base and the solder material, then these members are disposed opposite to each other with a suitable space, the solder material is poured into the space, and the members are bonded. There is another method according to which an additive such as Ti which can ensure wetting by forming a reactive layer of a nitride or an oxide on the surface of the ceramic base is added to the solder material, without carrying out the plating with a metal. However, in these methods, unless some means are adopted for reducing the thermal stress generated at the bonded part, cracks are often formed on the side of the ceramic base which is fragile against thermal stress or separation occurs at the bonded part to adversely affect various performances such as bonding strength and airtightness required for composite members. It is especially difficult to bond a member of low strength, such as aluminum nitride to a different member such as a metallic material while inhibiting the occurrence of the above problems.

In order to solve the above problems, there can be considered a method of bonding a base and a metallic member by liquid phase bonding with a solder material comprising only a metal of low proof stress such as Au which undergoes plastic deformation by a low stress. However, in the case of this method, if Ni, Co, Kovar or the like is used as the metallic member, the component (Fe, Ni, Co) diffuses into Au to cause increase of proof stress of the solder material, and as a result, the residual stress at the bonding cannot be completely absorbed by the plastic deformation of the solder material, and cracks occur in the ceramic base at the finishing of bonding or due to thermal cycle and thermal shock applied after the finishing of bonding.

Furthermore, it is known that when Au-18Ni solder material and an electrical conductor (Mo) are bonded, Ni in the solder material reacts with Mo to form a fragile texture. Therefore, when use of them as members for high-temperature heaters is supposed, endurance characteristics are deteriorated when the bonded part is exposed to thermal cycle and thermal shock, and, furthermore, the bonded part is rapidly deteriorated.

Moreover, when, for example, Kovar is used as the metallic member, the components constituting the Kovar (Fe, Ni, Co) diffuse into the solder material to form an intermetallic compound layer of low electrical conductivity, which causes deterioration of thermal cycle characteristics and abnormal heat generation at that part.

On the other hand, use of a metal which does not form solid solution with Au as the metallic member can also be considered, and W, Mo and the like can be mentioned as metallic materials which meet the requirement. However, these metallic materials are severely oxidized under high temperature conditions in the air, and cannot be used as metallic members for high-temperature heaters which are exposed to such conditions.

For solving the above problems, it has been attempted to devise the bonding structure. For example, JP-A-10-209255 discloses a bonding structure of a ceramic base and a connector for power supply which have the structure shown in FIG. 4 as a susceptor for disposing a semiconductor wafer. In FIG. 4, a hole 14 is provided in a ceramic base 1. In the hole 14, a metallic member 17 such as Mo is exposed which is previously embedded in the ceramic base 1 and has a thermal expansion coefficient approximate to that of the ceramic base 1. Furthermore, a cylindrical atmospheric protector 9 is inserted in the hole 14. Inside the atmospheric protector 9, there are inserted a power supplying connector 16 and a low thermal expansion material 15 for stress relaxation. The atmospheric protector 9 and the connector 16 are airtightly bonded with a solder material 5, and the low thermal expansion material 15 and the atmospheric protector 9 are airtightly bonded with solder material 5 in respect to the metallic member 17.

According to this bonding structure, the low thermal expansion material 15 and the metallic member 17 are relaxed in residual stress at bonding and, besides, oxidation of the metallic member 17 such as Mo is inhibited by the atmospheric protector 9, and, hence, even if bonding is performed using a solder material of high proof stress, such as above-mentioned Au-18Ni solder, cracks are not formed in the ceramic base 1 at bonding and furthermore endurance reliability is high in case the bonded part is exposed to thermal cycle and thermal shock at the time of using a high-temperature heater. However, the above bonding structure suffers from the problems that the number of parts increases, and very high production control capacity is required because the metallic member 17 is deteriorated due to oxidation unless the atmospheric protector 9 and the metallic member 17 are completely bonded.

Furthermore, JP-A-11-278951 discloses a bonded member and a bonding method as illustrated in FIGS. 5–7. Enclosed within chamber 21 of housing 20 is a ceramic susceptor 22, which has a wafer placing face 22a and a backside 22b. A wafer 24 is placed on wafer placing face 22a and a corrosion resistant metal ring 23, such as of Kovar, is attached at an interface portion 25 between susceptor 22 and metal ring 23 to back side 22b of ceramic susceptor 22 in the ceramic base having a structure shown in FIG. 5. These member structures are allowed to have the shapes as shown in FIG. 6 and FIG. 7 for relaxation of the generated thermal stress. That is, to allow the member structures to have these shapes is effective for thermal stress relaxation, but in the case of the ceramic being fragile, the solder material changes in properties due to dissolution of the metallic member in the method of bonding the metallic member and the ceramic base by melting the solder material as disclosed in the above patent publication, and the effect to relax the thermal stress is insufficient with giving only such care for the bonding structure as disclosed in the above patent publication, resulting in troubles such as rupture of the ceramic base.

The present invention has been made in view of the problems in the conventional techniques, and the object is to provide a composite member and a method for making the composite member, according to which a ceramic base having both the thermal cycle characteristics and the thermal shock characteristics and a metallic member are bonded to each other.

SUMMARY OF THE INVENTION

According to the present invention, there is provided a composite member made by bonding different members, namely, a ceramic base and a metallic member, characterized in that an active metal foil is disposed on the surface of the ceramic base and a solder material comprising Au is disposed on the active metal foil, the active metal foil and the solder material are heated to form a bonding layer, the metallic member is disposed on the surface of the bonding layer, and these are pressed and heated to bond the bonding layer and the metallic member through solid phase bonding.

Furthermore, according to the present invention, there is provided a composite member made by bonding different members, namely, a ceramic base and a metallic member, characterized in that an active metal foil is disposed on the surface of the ceramic base and a solder material comprising an Au—Ag alloy is disposed on the active metal foil, the active metal foil and the solder material are heated to form a bonding layer, the metallic member is disposed on the surface of the bonding layer, and these are pressed and heated to bond the bonding layer and the metallic member through solid phase bonding. In the present invention, it is preferred that the proportion of Ag contained in the Au—Ag alloy is 0.5–80 wt %.

Moreover, in the present invention, it is preferred that an electrical conductor comprising Mo, W or an alloy of Mo and W is embedded in the ceramic base with a part of the surface of the electrical conductor being exposed to the exterior of the ceramic base, and that the material of the ceramic base is at least one member selected from the group consisting of aluminumnitride, siliconnitride, alumina, zirconia, magnesia, spinel, and silicon carbide.

In the present invention, it is preferred that the material of the metallic member is at least one metal selected from the group consisting of Ni, Co, Fe and Cr, and it is also preferred that the material of the metallic member is an alloy having as main constituting elements at least one metal selected from the group consisting of Ni, Co, Fe and Cr.

Furthermore, in the present invention, it is preferred that the material of the active metal foil is at least one metal selected from the group consisting of Ti, Nb, Hf and Zr. The composite member made by bonding different members according to the present invention is suitably employed as a susceptor for disposing a semiconductor wafer.

On the other hand, according to the present invention, there is provided a method for making a composite member by bonding different members, namely, a ceramic base and a metallic member, characterized by including a first step of disposing an active metal foil on the surface of the ceramic base and a solder material comprising Au on the active metal foil and heating them to form a bonding layer comprising the solder material on the surface of the ceramic base, and a second step of disposing the metallic member on the surface of the bonding layer and pressing and heating them to bond the bonding layer and the metallic member through solid phase bonding.

In addition, according to the present invention, there is provided a method for making a composite member by bonding different members, namely, a ceramic base and a metallic member, characterized by including a first step of disposing an active metal foil on the surface of the ceramic base and a solder material comprising an Au—Ag alloy on the active metal foil and heating them to form a bonding layer comprising the solder material on the surface of the ceramic base, and a second step of disposing the metallic member on the surface of the bonding layer and pressing and heating them to bond the bonding layer and the metallic member through solid phase bonding. In the present invention, it is further preferred to use an Au—Ag alloy in which the proportion of Ag is 0.5–80 wt %.

In the present invention, it is preferred to use a ceramic base in which an electrical conductor comprising Mo, W or an alloy of Mo and W is embedded in the ceramic base with a part of the surface of the electrical conductor being exposed to the exterior of the ceramic base, and it is preferred to use a ceramic base comprising at least one material selected from the group consisting of aluminum nitride, silicon nitride, alumina, zirconia, magnesia, spinel and silicon carbide.

Furthermore, in the present invention, it is preferred to use a metallic member comprising at least one material selected from the group consisting of Ni, Co, Fe and Cr, and it is also preferred to use a metallic member comprising an alloy having, as main constituting elements, at least one material selected from the group consisting of Ni, Co, Fe and Cr.

In the present invention, it is preferred to use an active metal foil comprising at least one material selected from the group consisting of Ti, Nb, Hf and Zr.

BRIEF DESCRIPTION OF THE DRAWINGS

FIG. 1(a) shows the first step and FIG. 1(b) shows the second step.

FIG. 2(a) shows the first step and FIG. 2(b) shows the second step.

FIG. 3(a) shows the first step and FIG. 3(b) shows the second step.

DETAILED DESCRIPTION OF THE INVENTION

The embodiments of the present invention will be explained below. These embodiments should not be construed as limiting the invention in any manner.

Figure 1A:
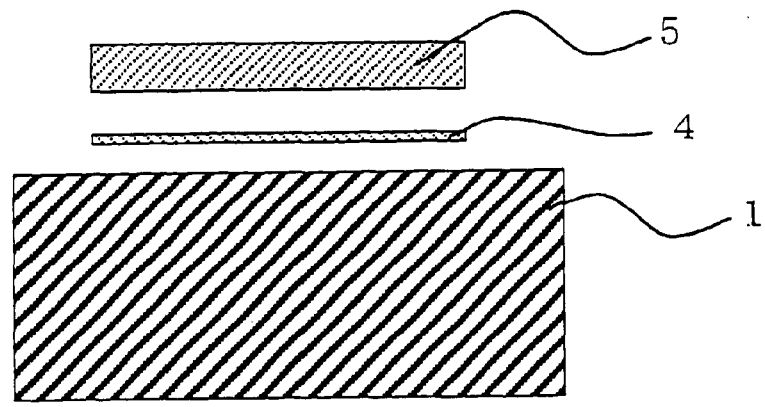
FIGS. 1(a) and (b) schematically show a first embodiment of the method for making the composite member according to the present invention.
Figure 1B:
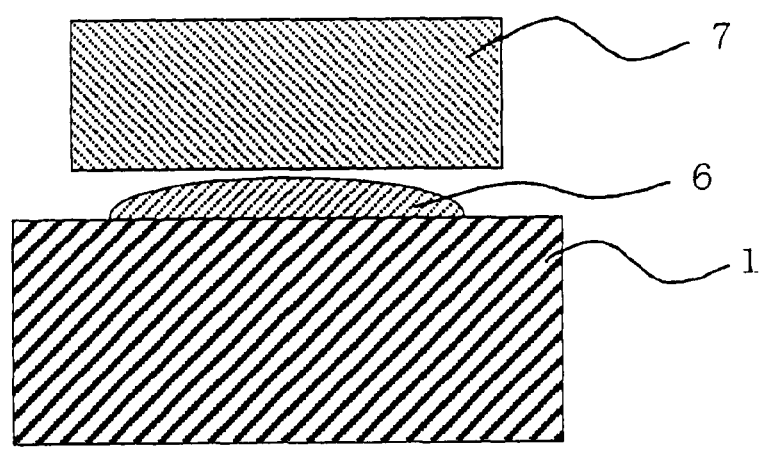

FIGS. 1(a) and (b) are schematic views which show the first embodiment of the method for making the composite member by bonding different members of the present invention (hereinafter referred to as "composite member"), and FIG. 1(a) shows the first step and FIG. 1(b) shows the second step. In the first step, an active metal foil 4 and a solder material comprising Au (Au solder material 5) are disposed so as to cover a ceramic base 1, followed by heating them to form a bonding layer 6. In the subsequent second step, a metallic member 7 is disposed on the surface of the bonding layer 6, and are bonded through solid phase bonding by pressing and heating them, thereby making a composite member.

The active metal foil 4 used in the first step is active for the ceramic base 1 and forms a reaction product layer at the interface of the ceramic base 1 and the Au solder material 5. Therefore, wettability of the ceramic base 1 with the Au solder material is improved and the bonding layer 6 having satisfactory airtightness is formed. Furthermore, due to the formation of this reaction product layer, the metallic element constituting the active metal foil 4 is almost consumed at the interface and does not remain in the Au solder material 5, and, hence, the phenomenon of increase of proof stress value of the Au solder material 5 does not occur.

Here, the first embodiment of the present invention is characterized by using the Au solder material. Au is a soft metal having low proof stress characteristics and can be a solder material having the feature of relaxing the thermal stress generated by thermal shock through plastic deformation. Accordingly, the composite member of the present invention made using the Au solder material is strong against thermal shock and improved in thermal cycle characteristics.

Figure 2A:
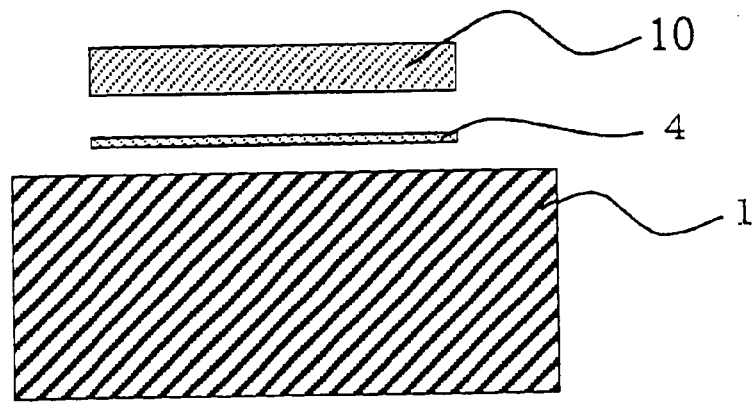
FIGS. 2(a) and (b) schematically show a second embodiment of the method for making the composite member according to the present invention.
Figure 2B:
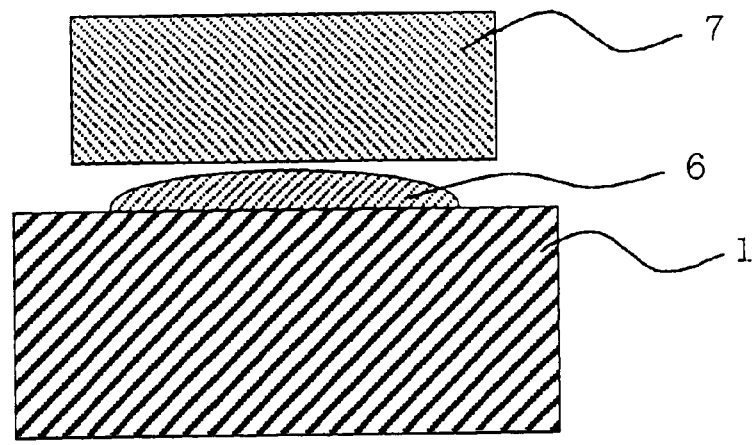

Next, the second embodiment of the present invention will be explained. FIGS. 2(a) and (b) are schematic views which show the second embodiment of the method for making the composite member the present invention, and FIG. 2(a) shows the first step and FIG. 2(b) shows the second step. In the first step, an active metal foil 4 and a solder material comprising an Au—Ag alloy (Au—Ag alloy solder material 10) are disposed so as to cover a ceramic base 1, followed by heating them to form a bonding layer 6. In the subsequent second step, a metallic member 7 is disposed on the surface of the bonding layer 6, and are bonded through solid phase bonding by pressing and heating them, thereby making a composite member.

The active metal foil 4 used in the first step is active for the ceramic base 1 and forms a reaction product layer at the interface of the ceramic base 1 and the Au—Ag alloy solder material 10. Therefore, wettability of the ceramic base 1 with the Au—Ag alloy solder material 10 is improved and the bonding layer 6 having satisfactory airtightness is formed. Furthermore, due to the formation of this reaction product layer, the metallic element constituting the active metal foil 4 is not dissolved in the Au—Ag alloy solder material 10 in the form of solid solution, and the phenomenon of increase of proof stress value of the Au—Ag alloy solder material 10 does not occur.

Here, the second embodiment of the present invention is characterized by using the Au—Ag alloy solder material comprising Au and Ag which is added to the Au. Even when Ag is added to Au, since Ag has substantially no effect of hardening by dissolving in the form of solid solution, like the Au solder material, the Au—Ag alloy solder material can be a solder material having the feature of relaxing through plastic deformation the residual stress generated due to the bonding. Accordingly, the composite member of the present invention made using the Au—Ag alloy solder material is strong against thermal shock and good in thermal cycle characteristics.

Furthermore, since an Au—Ag alloy solder material containing Ag in a given amount is used, the metallic elements constituting the metallic member which have high solid solution formability with Au, but substantially no solid solution formability with Ag, such as Ni, Co, Cr and Fe, are effectively prevented from dissolving in the solder material to form solid solution. Therefore, even when the composite member is used under the temperature conditions of 850–900° C. or higher, the metallic element constituting the metallic member does not dissolve in the solder material in the form of solid solution to diffuse therein, namely, the low proof stress value of the bonding layer is not damaged, and thus a composite member having high-temperature endurance can be provided.

In the second embodiment of the present invention, the proportion of Ag contained in Au—Ag alloys used for bonding is preferably 0.5–80 wt %, more preferably 5–40 wt %, and especially preferably 10–30 wt %. This is because if the proportion of Ag is less than 0.5 wt %, the effect to inhibit the dissolution of metallic elements in the form of solid solution cannot be sufficiently exhibited, and if the composite member is used under high temperature conditions, the metallic elements constituting the metallic member dissolves in the solder material to form solid solution. The higher proportion of Ag causes increase of the effect to inhibit dissolution of the metallic elements in the form of solid solution. If the proportion of Ag exceeds 80 wt %, dissolution and diffusion of oxygen atom in the phase of solder material becomes conspicuous, and this is not preferred in case the present bonding method is applied to members which are used in oxidizing atmosphere.

Furthermore, when materials bonded with the above solder material are used by passing an electric current therethrough, in the case of the proportion of Ag being more than 80 wt %, a migration phenomenon occurs and this is also one of restrictions in use. Moreover, when the material to be bonded is AlN (aluminum nitride), Mo which has a thermal expansion coefficient approximate to that of AlN is used preferably, for example, as a metal embedded as heater member, but an oxide of Mo forms a low-melting compound with Ag to become liquid, and this is also a restriction in use.

Amount of the Au solder material or Au—Ag alloy solder material used in the method for making the composite member according to the present invention varies depending on the shape of the bonded part, but may be such that the solder material can cover the disposed active metal foil and can be optionally adjusted within the range where the solder material can be molten by heating. Moreover, in order to reduce residual stress at the time of bonding, it is more preferred that the thickness is not less than 0.3 mm. Furthermore, the feature of the metals used as the solder material that the thermal stress is relaxed by plastic deformation is not damaged due to mixing them, and in the case of using Au—Ag alloy solder material, it is never precluded to use them in admixture as far as the effect to inhibit diffusion of the metallic element into the solder material which is imparted by the addition of Ag is not damaged.

When AlN (aluminum nitride) is used as material for the ceramic base and Ti is used as the active metal foil, a thin film layer of TiN is formed at the interface between AlN and the solder material by heating them. In this case, all of Ti is consumed by the reaction with AlN, and, hence, Ti does not dissolve in the solder material in the form of solid solution and there is formed a bonding layer which maintains the low proof stress characteristics of the solder material.

In the above-mentioned case, amount of Ti based on the Au solder material or Au—Ag alloy solder material is preferably 0.03–10 wt %, more preferably 0.1–2 wt %. If the amount is less than 0.03 wt %, failure in bonding may occur, and if it is more than 10 wt %, Ti remains in the solder material, resulting in cracking of AlN due to increase in proof stress of the solder material.

Furthermore, since solid phase bonding by pressing and heating is employed in the second step, the metal components constituting the metallic member can be prevented from dissolving in the bonding layer to form solid solution. Therefore, the heating temperature in the second step is preferably a temperature at which solid phase bonding can be performed, namely, a temperature lower than the melting point of the solder material. For example, in the case of using an Au solder material, the temperature is preferably 750–1000° C., more preferably 850–950° C. Furthermore, in the case of using an Au—Ag alloy solder material, the heating temperature is preferably a temperature lower by 50–200° C. than the melting point of the solder material, namely, 750–1000° C., though it depends on the amount of Ag. Thus, there occurs no phenomenon of increase in proof stress value caused by dissolution of the metal components into the bonding layer which is a problem in liquid phase bonding of the conventional method.

As mentioned above, since the composite member of the present invention is made through bonding steps comprising the first step and the second step, there can be provided a composite member which maintains the low proof stress characteristics of the Au solder material and Au—Ag alloy solder material forming the bonding layer and which is improved in reliability against thermal cycle and thermal shock.

Figure 3A:
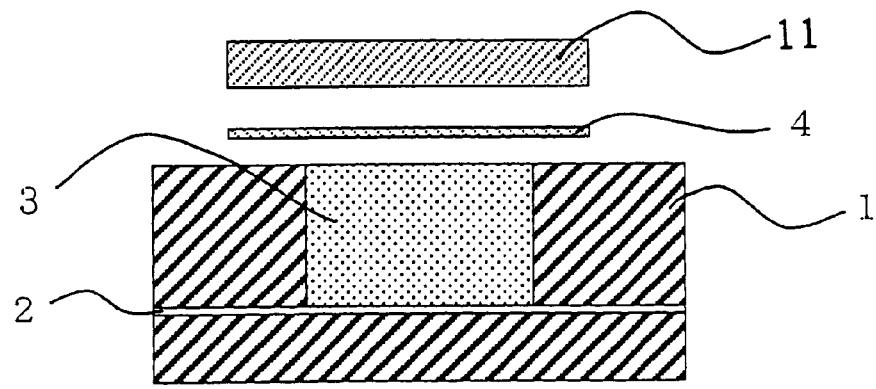
FIGS. 3(a) and (b) schematically show another embodiment of the method for making the composite member according to the present invention.
Figure 3B:
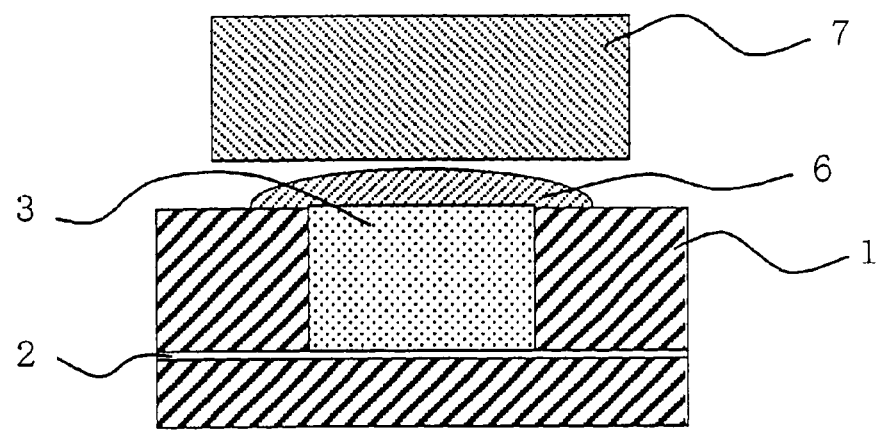
Figure 4:
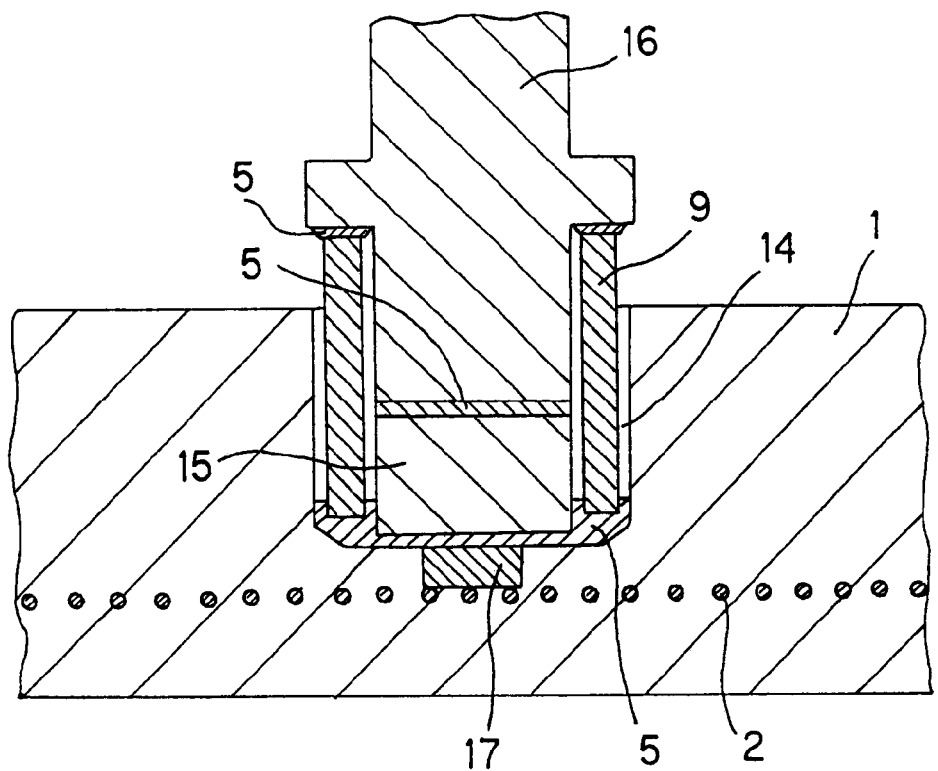
FIG. 4 is a sectional view which shows one example of bonding structure of a susceptor (conventional one) for disposing a semiconductor wafer.
Figure 5:
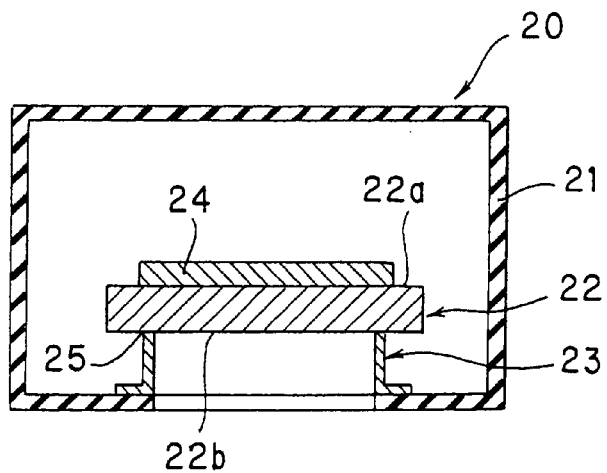
FIG. 5 is a sectional view which shows another example of bonding structure of a susceptor (conventional one) for disposing a semiconductor wafer.
Figure 6:
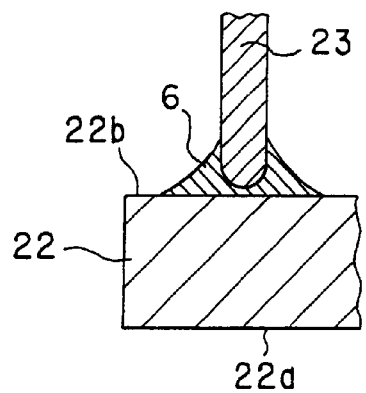
FIG. 6 is a partial sectional view which shows one example of bonding state (conventional) of a ring and a susceptor.
Figure 7:
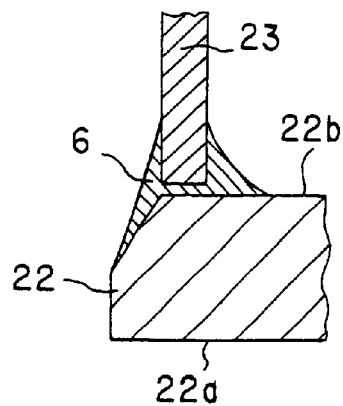
FIG. 7 is a partial sectional view which shows another example of bonding state (conventional) of a ring and a susceptor.

In the present invention, it is preferred that an electrical conductor comprising Mo, W or an alloy of Mo and W is embedded in the ceramic base in such a state that a part of the surface of the electrical conductor is exposed to the exterior of the ceramic base. FIG. 3 schematically shows another embodiment of the method for making the composite member according to the present invention, wherein FIG. 3(a) shows the first step and FIG. 3(b) shows the second step. An Mo mesh 2 and an electrical conductor (Mo) 3 disposed so as to be electrically connected to the Mo mesh 2 are embedded in the ceramic base 1. In the first step, an active metal foil 4 and a solder material 11 are disposed so as to cover the surface of the Q ceramic base 1 and that of the electrical conductor (Mo) 3, followed by heating them to form a bonding layer 6. In the subsequent second step, a metallic member 7 is disposed on the surface of the bonding layer 6, followed by performing solid phase bonding by pressing and heating them to make a composite member.

The active metal foil 4 used in the first step is active for the ceramic base 1 and forms a reaction product layer at the interfaces between the ceramic base 1 and the solder material 11 and between the electrical conductor (Mo) 3 and the solder material 11. Accordingly, wettability of the ceramic base 1 with the solder material 11 is improved and simultaneously airtightness can be secured. As a result, the electrical conductor (Mo) 3 embedded in the ceramic base 1 is not exposed to the air, and, hence, oxidative deterioration of the electrical conductor hardly occurs.

The "solder material" in FIGS. 3(a)(b) maybe either Au solder material or Au—Ag solder material.

In the present invention, material of the ceramic base is preferably at least one selected from the group consisting of aluminum nitride, silicon nitride, alumina, zirconia, magnesia, spinel and silicon carbide. The ceramic base may be one which causes occurrence of reaction by heating together with the active metal foil, and the above materials can be used. The above materials can constitute the ceramic base each alone or in combination of two or more. Therefore, by optional selection of the ceramic base comprising one of or combination of the above materials, composite members and devices comprising these composite members suitable for the uses such as requiring high heat resistance and high hardness can be provided.

Moreover, in the present invention, it is preferred that the material of the metallic member is at least one selected from the group consisting of Ni, Co, Fe and Cr, or an alloy having, as main constituting element, at least one selected from the group consisting of Ni, Co, Fe and Cr. These metals or alloys are excellent in oxidation resistance in high temperature areas. These metals or components of the alloys do not dissolve in the form of solid solution into the Au solder material or Au—Ag alloy solder material used at the solid phase bonding in the method for making the composite member according to the present invention, and, hence, do not damage the low proof stress characteristics possessed by the solder materials. As a result, composite members excellent in thermal cycle characteristics and thermal shock characteristics can be provided.

The alloy having, as main constituting elements, at least one selected from the group consisting of Ni, Co, Fe and Cr means that contents of the metals are such that physical characteristics of the metal of Ni, Co, Fe or Cr are markedly developed and is an alloy having a content of Ni+Co+Fe+Cr of not less than 50 wt %.

The shape of the metallic member is not limited to the one shown in FIGS. 1(a) and (b), but various shapes such as columnar, square pillar, pyramid, ring and other shapes can be optionally employed.

Furthermore, these metals or alloys are hardly oxidized in an oxidation resistance test at 800° C. in the air, and have an oxidation resistance necessary for the use as metallic terminals for electrical supply of susceptors for disposing semiconductor wafers used in production of semiconductors and, besides, are excellent in electrical conductivity necessary for the use as metallic terminals. Therefore, these metals are preferred from the points that they can constitute the members for high temperature heaters and they are inexpensive and easily available.

In the composite member and the method for making it according to the present invention, it is preferred that the material of the active metal foil is at least one selected from the group consisting of Ti, Nb, Hf and Zr. Since the active metal foil comprising the above material once dissolves in the solder material to form solid solution and then forms a reaction product such as a nitride with the ceramic base, wettability of the ceramic base with the solder material is improved. Furthermore, by using a suitable amount of the above active metal in the form of a foil, almost all of it is consumed by the reaction at the interface, and substantially no active metal used remains in the solder material. Accordingly, proof stress of the solder material can be kept low and thermal stress of the material to be bonded can be diminished by the relaxation effect due to the plastic deformation, and, besides, the trouble that the embedded Mo is exposed to the air can be solved. Thus, a bonding layer having reliability in airtightness can be formed, and composite members having long-term reliability can be provided.

The composite member comprising a ceramic base and a metallic member bonded according to the present invention can be suitably employed as a susceptor for disposing a semiconductor wafer in apparatuses for producing semiconductors utilizing its excellent thermal cycle characteristics and thermal shock resistance, more specifically, as a composite member incorporated in devices which exhibit electrostatic chuck function and heater function by metallic electrodes or metallic heaters contained therein.

Examples of the present invention will be explained below, but these examples should not be construed as limiting the invention.

EXAMPLE 1

Figure 8:
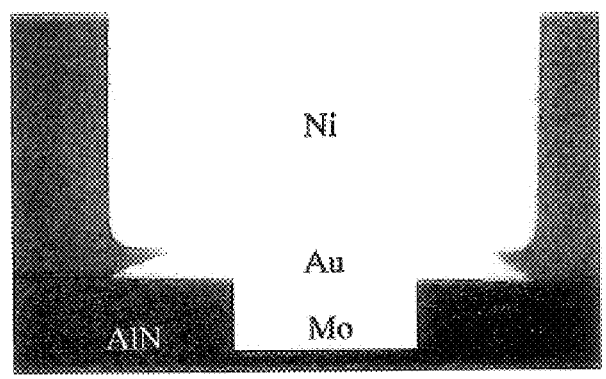
FIG. 8 is a photograph of metallic texture and ceramic texture which are sectional structures of the composite member made in Example 1.

In an AlN base (200 mm Ø in diameter×20 mm in thickness) were embedded an Mo mesh (a wire mesh prepared by knitting Mo wires of 0.12 mm Ø in diameter at a density of 50 wires per 1 inch) and an electrical conductor (a molded body obtained by molding Mo powders of 1–100 μm in particle diameter: 3 mm Ø in diameter) which was electrically connected to the Mo mesh, and the portion of the AlN base in which the electrical conductor was embedded was bored, thereby exposing the electrical conductor. On the surface including this electrical conductor and the circumference thereof were disposed a Ti foil (5 μm in thickness) and a pure Au solder material (0.3 mm in thickness), followed by subjecting to a heat treatment at 1100° C. for 10 minutes in a vacuum atmosphere to perform soldering onto the AlN base. An Ni terminal (5 mm Ø in diameter) was disposed on the bonding layer, followed by carrying out solid phase bonding by a pressing and heating treatment at 870° C. for 30 minutes under a load of 1 kgf in a vacuum atmosphere, thereby bonding the Ni terminal to the solder material to prepare three samples (Sample Nos. 1–3) in total. A photograph of sectional structure of the composite member slowly cooled to about room temperature is shown in FIG. 8, and an enlarged photograph of sectional structure of the bonded part is shown in FIG. 9.

Moreover, three samples (Sample Nos. 4–6) in total were prepared in the same manner as above, except that the time for bonding the Ni terminal was 10 minutes.

Figure 9:
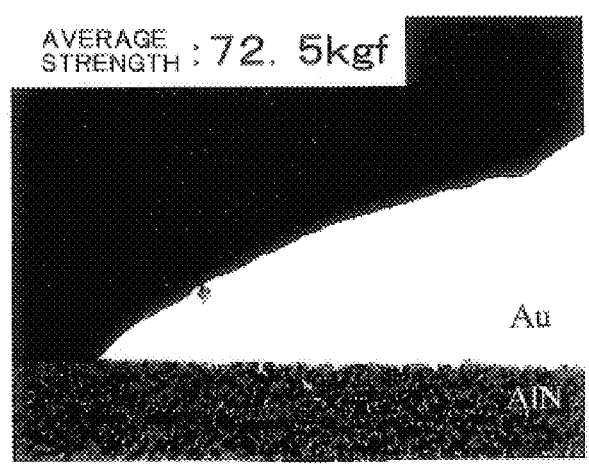
FIG. 9 is an enlarged photograph of metallic texture and ceramic texture which are sectional structures around the bonded part of the composite member made in Example 1.

The composite members of the present invention made by the above method had no cracks in the AlN base as shown in FIG. 9. It is considered that this is because Ni and Ti did not dissolve in the pure Au solder material in the form of solid solution and the low proof stress characteristics of the pure Au solder material was maintained, whereby the stress generated due to the difference in thermal expansion coefficient of the pure Au solder material and the AlN base could be relaxed.

Tensile strength of Sample Nos. 1–3 was measured. The results are shown in Table I.

TABLE 1

| Sample no. | Soldering condition | | Ni-terminal boding conditions | | Rupture load (kgf) | Average rupture load (kgf) |
|---|---|---|---|---|---|---|
| | Temp. (° C.) | Time (min.) | Temp. (° C.) | Time (min.) | | |
| 1 | 1100 | 10 | 870 | 30 | 97.5 | 72.5 |
| 2 | 1100 | 10 | 870 | 30 | 62.0 | |
| 3 | 1100 | 10 | 870 | 30 | 58.0 | |

Figure 10:
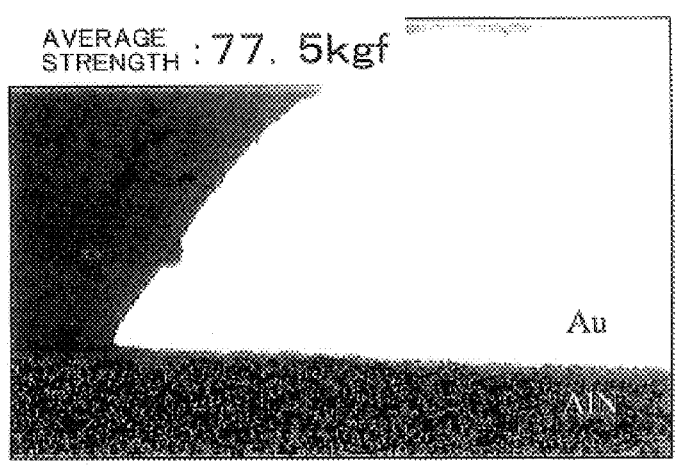
FIG. 10 is an enlarged photograph of metallic texture and ceramic texture which are sectional structures around the bonded part of the composite member made in Example 1 after subjected to thermal cycle test.

Sample Nos. 4–6 were subjected to a thermal cycle test of 100 cycles at 700° C, and, thereafter, tensile strength thereof was measured. The results are shown in Table 2. An enlarged photograph of sectional structure of the bonded part after carrying out the thermal cycle test is shown in FIG. 10.

TABLE 2

| Sample no. | Soldering condition | | Ni-terminal boding conditions | | Rupture load (kgf) | Average rupture load (kgf) |
|---|---|---|---|---|---|---|
| | Temp. (° C.) | Time (min.) | Temp. (° C.) | Time (min.) | | |
| 4 | 1100 | 10 | 870 | 30 | 61.7 | 77.5 |
| 5 | 1100 | 10 | 870 | 30 | 78.7 | |
| 6 | 1100 | 10 | 870 | 30 | 91.8 | |

* Thermal cycle test conditions: 700° C. × 100 cycles

The tensile strength did not decrease even after the thermal cycle test, and, besides, no cracks occurred in the AlN base (FIG. 10). Thus, excellent characteristics of the composite members of the present invention were recognized.

Comparative Example 1

In an AlN base (200 mm Ø in diameter×20 mm in thickness) were embedded an Mo mesh (a wire mesh prepared by knitting Mo wires of 0.12 mm Ø in diameter at a density of 50 wires per 1 inch) and an electrical conductor (a molded body obtained by molding Mo powders of 1–100 βm in particle diameter: 3 mm Ø in diameter) which was electrically connected to the Mo mesh, and the portion of the base in which the electrical conductor was embedded was bored, thereby exposing the electrical conductor. On the surface including this electrical conductor and the circumference thereof were disposed a Ti foil (5 βm in thickness), a Au-18Ni solder material (0.3 mm in thickness) and an Ni terminal (5 mm Ø in diameter), followed by carrying out liquid phase bonding by the heat treatment at 1100° C. for 10 minutes in a vacuum atmosphere to bond the Ni terminal to the AlN base. An enlarged photograph of sectional structure of the bonded part of the composite member gradually cooled to about room temperature is shown in FIG. 11.

Figure 11:
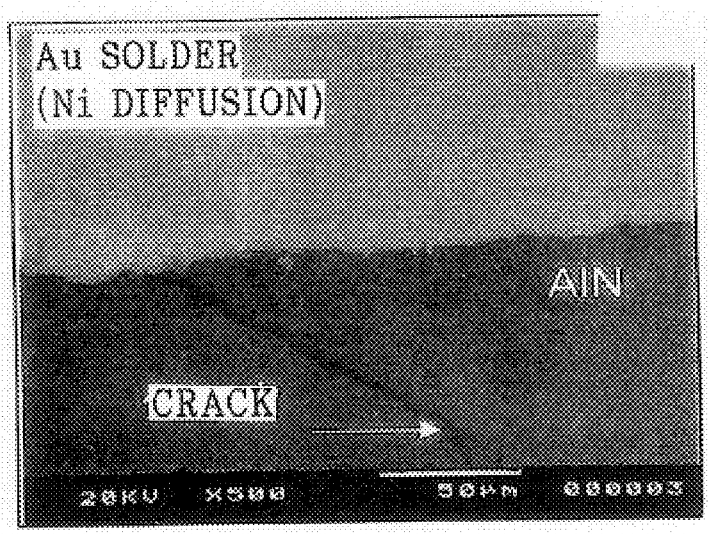
FIG. 11 is an enlarged photograph of metallic texture and ceramic texture which are sectional structures around the bonded part of the composite member made in Comparative Example 1.

The composite member prepared by the above method had cracks in the AlN base as shown in FIG. 11. It is considered that this is because the proof stress value of the Au-18Ni solder material was higher than that of AlN, and, hence, the stress generated due to the difference in thermal expansion coefficient of the solder material and the AlN base could not be relaxed.

Comparative Example 2

Figure 12:
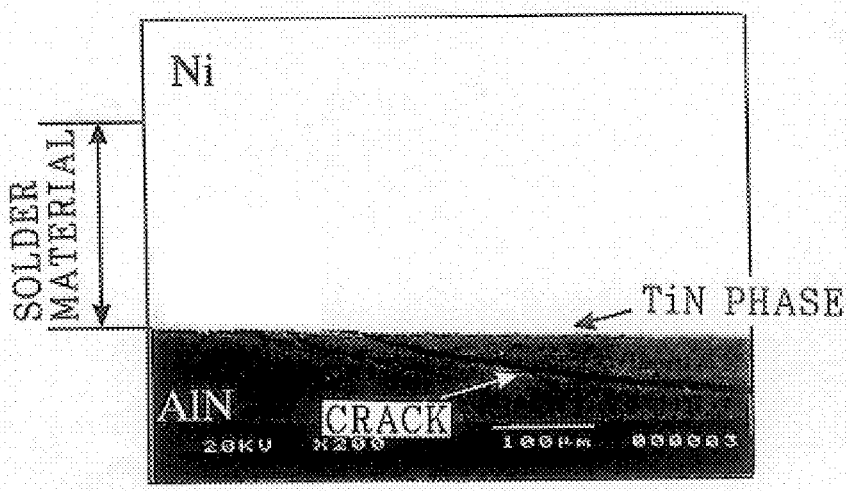
FIG. 12 is an enlarged photograph of metallic texture and ceramic texture which are sectional structures around the bonded part of the composite member made in Comparative Example 2.

In an AlN base (200 mm Ø in diameter×20 mm in thickness) were embedded an Mo mesh (a wire mesh prepared by knitting Mo wires of 0.12 mm Ø in diameter at a density of 50 wires per 1 inch) and an electrical conductor (a molded body obtained by molding Mo powders of 1–100 μm in particle diameter: 3 mm Ø in diameter) which was electrically connected to the Mo mesh, and the portion of the AlN base in which the electrical conductor was embedded was bored, thereby exposing the electrical conductor. On the surface including this electrical conductor and the circumference thereof were disposed a Ti foil (5 μm in thickness), a pure Au solder material (0.3 mm in thickness) and an Ni terminal (5 mm in diameter), followed by carrying out liquid phase bonding by a heat treatment at 1100° C. for 10 minutes in a vacuum atmosphere to bond the Ni terminal onto the AlN base. An enlarged photograph of sectional structure around the bonded part of the composite member slowly cooled to about room temperature is shown in FIG. 12. A part of the solder material layer after performing the bonding was taken and subjected to compositional analysis to find that it comprised Au-43.4 wt % Ni, and Ni dissolved in the pure Au solder material in the state of solid solution.

The composite member prepared by the above method had cracks in the AlN base as shown in FIG. 12. It is considered that this is because Ti and Ni dissolved in the pure Au solder material to form solid solution, whereby the proof stress value of the pure Au solder material increased, and, thus, the stress generated due to the difference in thermal expansion coefficient of the pure Au solder material and the AlN base could not be relaxed.

EXAMPLE 2

In an AlN base (30×30 mm×20 mm thick) were embedded an Mo mesh (a wire mesh prepared by knitting Mo wires of 0.12 mm Ø in diameter at a density of 50 wires per 1 inch) and an electrical conductor (a molded body obtained by molding Mo powders of 1–100 μm in particle diameter: 3 mm Ø in diameter) which was electrically connected to the Mo mesh, and the portion of the AlN base in which the electrical conductor was embedded was bored, thereby exposing the electrical conductor. On the surface including this electrical conductor and the circumference thereof were disposed a Ti foil (5 μm in thickness) and a solder material (0.3 mm in thickness) having the composition as shown in Table 1, followed by subjecting to heat treatment at 1100° C. for 10 minutes in a vacuum atmosphere to perform soldering onto the AlN base. An Ni terminal (5 mm Ø in diameter) was disposed on the solder layer, followed by subjecting to solid phase bonding by a pressing and heating treatment at 870° C. for 10 minutes under a load of 1 kgf in a vacuum atmosphere, thereby bonding the Ni terminal to the bonding layer to prepare AlN base-Ni terminal composite members (Sample Nos. 7–18).

The composite members of Samples No. 7–18 were slowly cooled to about room temperature, and they were cut perpendicular to the bonded face and the section was observed to examine whether cracks occurred or not in the AlN base.

Furthermore, the composite members made in the above step were slowly cooled by keeping them for 100–1000 hours at 700° C., 750° C., 800° C., 850° C. and 900° C. in the air, and then they were cut in the same manner as above, followed by observing to evaluate occurrence of cracks in the AlN base, hardness of the solder material in this case, and diffusion of the Ni component into the solder material by EDS and diffusion of oxygen and accumulation of oxygen at the bonding interface by EDS. The results are shown in Table 3.

The hardness (HV) of the solder material is an average value of the hardness measured at the three points of the central portion in the thickness direction of the solder material layer having a thickness of 0.3 mm. As to the judgement on the inhibition of diffusion of Ni, when amount of Ni was not less than 3 wt % (by EDS) at the central portion in the thickness direction of the solder material layer having a thickness of about 0.5 mm, this is shown by X, and when it was less than 3 wt %, this is shown by ○. As to the judgement on the inhibition of cracking of the AlN base, observation by a light microscope (polarizing microscope) was conducted after cutting the bonded body, and when there were no cracks, this is shown by ○, and when there were cracks, this is shown by X. As to the judgement on the inhibition of diffusion of oxygen, presence or absence of an oxidation layer formed by oxygen diffused through the solder material was examined at the interface layer between the AlN base and the solder material by a light microscope, and when the oxidation layer was not seen, this is shown by ○, and when the oxidation layer was seen, this is shown by X.

Furthermore, HV denotes the hardness of the solder material, Dif. Inhib. denotes Inhibition of diffusion of Ni, Crack Inhib. denotes Inhibition of cracking of AlN base, and O-dif. Inhib. denotes Inhibition of diffusion of oxygen, respectively.

TABLE 3

| Sample No. | | 7 | 8 | 9 | 10 | 11 | 12 | 13 | 14 | 15 | 16 | 17 | 18 |
|---|---|---|---|---|---|---|---|---|---|---|---|---|---|
| Kind of solder materials | | Au | Au - 0.2 Ag | Au - 0.5 Ag | Au - 4.7 Ag | Au - 11 Ag | Au - 19 Ag | Au- 29 Ag | Au - 43 Ag | Au - 52 Ag | Au - 58 Ag | Au - 82 Ag | Ag |
| After solid phase Bonding | HV | 42 | 38 | 41 | 43 | 44 | 43 | 39 | 41 | 41 | 42 | 44 | 43 |
| | Dif. Inhib. | ○ | ○ | ○ | ○ | ○ | ○ | ○ | ○ | ○ | ○ | ○ | ○ |
| | Crack Inhib. | ○ | ○ | ○ | ○ | ○ | ○ | ○ | ○ | ○ | ○ | ○ | ○ |
| | O-dif. Inhib. | ○ | ○ | ○ | ○ | ○ | ○ | ○ | ○ | ○ | ○ | ○ | ○ |

TABLE 3-continued

| Sample No. | | 7 | 8 | 9 | 10 | 11 | 12 | 13 | 14 | 15 | 16 | 17 | 18 |
|---|---|---|---|---|---|---|---|---|---|---|---|---|---|
| 700° C., after 1000 hrs. | HV | 55 | 44 | 43 | 39 | 48 | 46 | 43 | 44 | 44 | 48 | 52 | 46 |
| | Dif. Inhib. | ○ | ○ | ○ | ○ | ○ | ○ | ○ | ○ | ○ | ○ | ○ | ○ |
| | Crack Inhib. | ○ | ○ | ○ | ○ | ○ | ○ | ○ | ○ | ○ | ○ | ○ | ○ |
| | O-dif. Inhib. | ○ | ○ | ○ | ○ | ○ | ○ | ○ | ○ | ○ | ○ | ○ | ○ |
| 750° C., after 1000 hrs. | HV | 85 | 58 | 46 | 48 | 44 | 44 | 46 | 44 | 52 | 48 | 46 | 44 |
| | Dif. Inhib. | X | ○ | ○ | ○ | ○ | ○ | ○ | ○ | ○ | ○ | ○ | ○ |
| | Crack Inhib. | X | ○ | ○ | ○ | ○ | ○ | ○ | ○ | ○ | ○ | ○ | ○ |
| | O-dif. Inhib. | ○ | ○ | ○ | ○ | ○ | ○ | ○ | ○ | ○ | ○ | ○ | ○ |
| 800° C., after 1000 hrs. | HV | 96 | 68 | 54 | 44 | 44 | 52 | 48 | 46 | 43 | 39 | 48 | 48 |
| | Dif. Inhib. | X | X | ○ | ○ | ○ | ○ | ○ | ○ | ○ | ○ | ○ | ○ |
| | Crack Inhib. | X | X | ○ | ○ | ○ | ○ | ○ | ○ | ○ | ○ | ○ | ○ |
| | O-dif. Inhib. | ○ | ○ | ○ | ○ | ○ | ○ | ○ | ○ | ○ | ○ | X | X |
| 850° C., after 1000 hrs. | HV | 147 | 122 | 112 | 64 | 46 | 43 | 44 | 44 | 46 | 48 | 50 | 44 |
| | Dif. Inhib. | X | X | X | ○ | ○ | ○ | ○ | ○ | ○ | ○ | ○ | ○ |
| | Crack Inhib. | X | X | X | ○ | ○ | ○ | ○ | ○ | ○ | ○ | ○ | ○ |
| | O-dif. Inhib. | ○ | ○ | ○ | ○ | ○ | ○ | ○ | ○ | ○ | X | X | X |
| 900° C., after 100 hrs. | HV | 220 | 192 | 164 | 85 | 65 | 52 | 48 | 48 | 44 | 48 | 52 | 46 |
| | Dif. Inhib. | X | X | X | X | X | ○ | ○ | ○ | ○ | ○ | ○ | ○ |
| | Crack Inhib. | X | X | X | X | ○ | ○ | ○ | ○ | ○ | ○ | ○ | ○ |
| | O-dif. Inhib. | ○ | ○ | ○ | ○ | ○ | ○ | ○ | ○ | X | X | X | X |
| 900° C., after 1000 hrs. | HV | 255 | 225 | 185 | 158 | 155 | 67 | 54 | 48 | 48 | 46 | 48 | 44 |
| | Dif. Inhib. | X | X | X | X | X | ○ | ○ | ○ | ○ | ○ | ○ | ○ |
| | Crack Inhib. | X | X | X | X | X | ○ | ○ | ○ | ○ | ○ | ○ | ○ |
| | O-dif. Inhib. | ○ | ○ | ○ | ○ | ○ | ○ | X | X | X | X | X | X |

From the results of evaluation shown in Table 3, it was confirmed that with increase of the proportion of Ag added, dissolution of Ni into the Au—Ag solder material was effectively inhibited and simultaneously the hardness of the solder material was kept low and, as a result, breakage of the AlN base was inhibited. Furthermore, when the proportion of Ag was increased to more than necessary, diffusion of oxygen into the solder material became vigorous to cause defects at the bonded interface.

Figure 13:
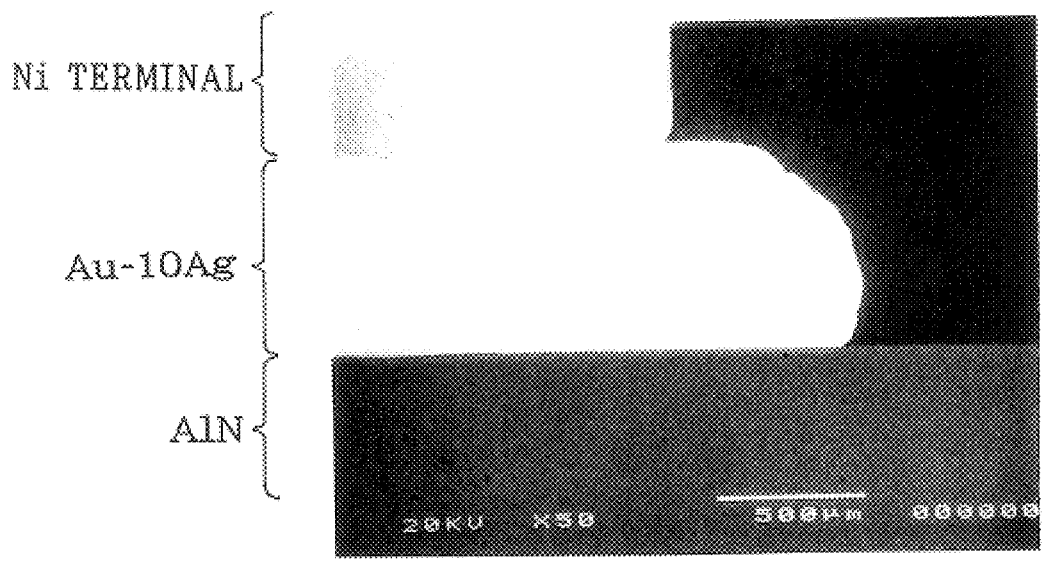
FIG. 13 is a photograph of metallic texture and ceramic texture which are sectional structures of the composite member made in Example 2.
Figure 14:
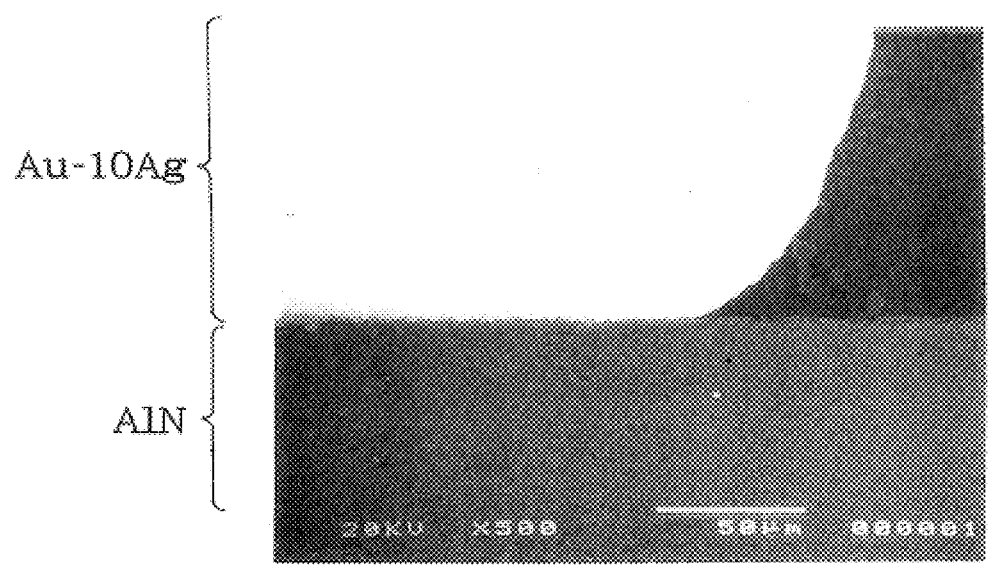
FIG. 14 is an enlarged photograph of metallic texture and ceramic texture which are sectional structures around the bonded part of the composite member made in Example 2.

The metallic texture and the texture of the ceramic material in the sectional structure of the composite member made by bonding with a solder material of Au-10Ag and slowly cooled to about room temperature are shown in an enlarged photograph of FIG. 13, and an enlarged photograph of the bonded part and the circumference thereof of FIG. 13 is shown in FIG. 14.

EXAMPLE 3

In an AlN base (200 mm Ø in diameter×20 mm in thickness) were embedded an Mo mesh (a wire mesh prepared by knitting Mo wires of 0.12 mm Ø in diameter at a density of 50 wires per 1 inch) and a plurality of electrical conductors (molded bodies obtained by molding Mo powders of 1–100 μm in particle diameter: 3 mm Ø in diameter) which were electrically connected to the Mo mesh, and the portion of the AlN base in which the electrical conductors were embedded was bored, thereby exposing the electrical conductors. On the surface including these electrical conductors and the circumference thereof were disposed a Ti foil (5 μm in thickness) and a solder material (0.3 mm in thickness) having the composition as shown in Table 2, followed by subjecting to a heat treatment at 1100° C. for 10 minutes in a vacuum atmosphere to perform soldering onto the AlN base. An Ni terminal (5 mm Ø in diameter) was disposed on the bonding layer, followed by subjecting to solid phase bonding by a pressing and heating treatment at 870° C. for 10 minutes under a load of 1 kgf in a vacuum atmosphere, thereby bonding the Ni terminal to the bonding layer to prepare AlN base-Ni terminal composite members (Sample Nos. 19–25).

Each sample was kept at 850° C. for 100 hour with passing an electric current of 20 A through the Ni terminal, and it was examined whether a migration phenomenon occurred or not. The results of evaluation are shown in Table 4. When occurrence of the migration phenomenon was inhibited, this is shown by ○, when it was not inhibited, this is shown by X and when it was not completely inhibited and occurred slightly, this is shown by ▲.

TABLE 4

| Sample No. | 19 | 20 | 21 | 22 | 23 | 24 | 25 |
|---|---|---|---|---|---|---|---|
| Kind of soldering material | Au | Au - 11 Ag | Au - 19 Ag | Au - 43 Ag | Au - 58 Ag | Au - 82 Ag | Ag |
| Inhibition of occurrence of migration phenomenon | ○ | ○ | ○ | ○ | ○ | ▲ | X |

It was confirmed that the migration phenomenon occurred only when the proportion of Ag added to the Au solder material was high.

Comparative Example 3

Figure 15:
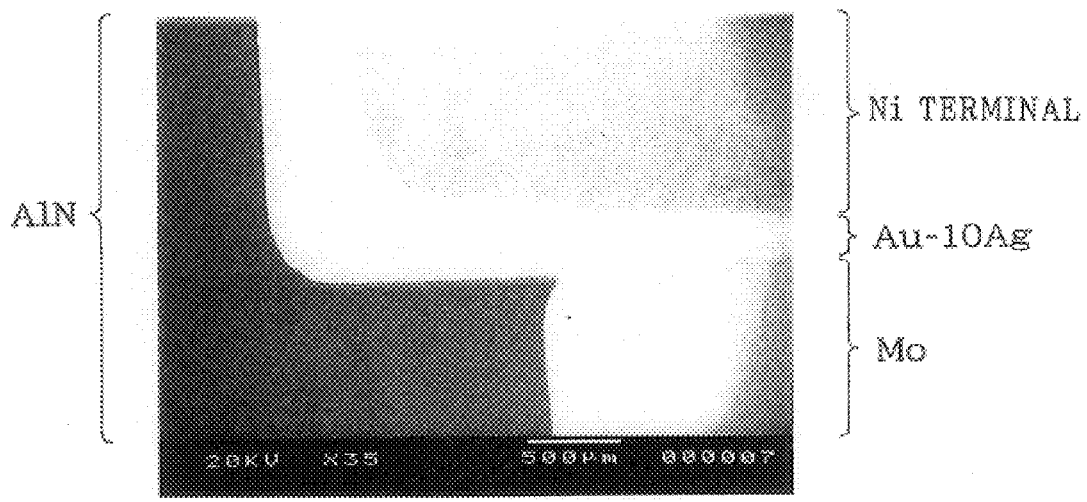
FIG. 15 is an enlarged photograph of metallic texture and ceramic texture which are sectional structures around the bonded part of the composite member made in Example 2 after subjected to thermal cycle test.

In an AlN base (30×30 mm×20 mm in thickness) were embedded an Mo mesh (a wire mesh prepared by knitting Mo wires of 0.12 mm in diameter at a density of 50 wires per 1 inch) and an electrical conductor (a molded body obtained by molding Mo powders of 1–100 μm in particle diameter: 3 mm Ø in diameter) which was electrically connected to the Mo mesh, and the portion of the AlN base in which the electrical conductor was embedded was bored, thereby exposing the electrical conductors. On the surface including this electrical conductor and the circumference thereof were disposed a Ti foil (5 μm in thickness) and an Au-10 Ag solder material (0.3 mm in thickness), followed by subjecting to a heat treatment at 1100° C. for 10 minutes in a vacuum atmosphere to perform soldering onto the AlN base. An Ni terminal (5 mm Ø in diameter) was disposed on the bonding layer, followed by subjecting to liquid phase bonding by a heat treatment at 1100° C. for 10 minutes in a vacuum atmosphere, thereby bonding the Ni terminal to the bonding layer to prepare AlN base-Ni terminal composite member. The metallic texture and the texture of the ceramic material in the sectional structure of the composite member slowly cooled to about room temperature are shown in an enlarged photograph of FIG. 15, and an enlarged photograph of the bonded part of FIG. 15 is shown in FIG. 16.

Figure 16:
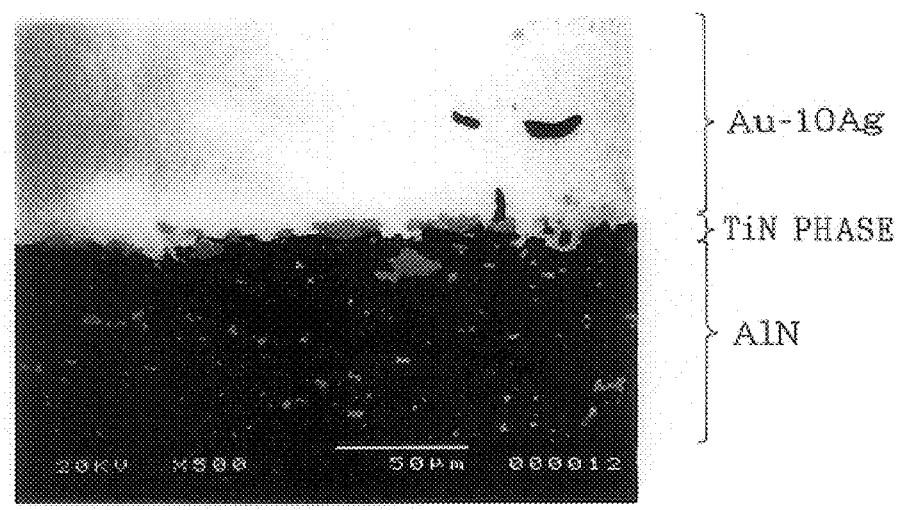
FIG. 16 is an enlarged photograph of metallic texture and ceramic texture which are sectional structures around the bonded part of the composite member made in Comparative Example 3.

The composite member made by the above method had cracks in the AlN base as shown in FIG. 16. It is considered that this is because since the bonding layer comprising the Au-10Ag solder material and the Ni terminal were bonded by liquid phase bonding, Ni dissolved into the bonding layer to form solid solution, thereby causing increase of the proof stress value of the Au-10Ag solder material than that of AlN, and, as a result, the stress generated by the difference in thermal expansion coefficient of the solder material and the AlN base could not be relaxed. Moreover, when hardness of the solder material was measured, increase of the hardness was recognized and, thus, increase of proof stress of the solder material was substantiated.

When the results of Examples 2 and 3 are compared with those of Comparative Example 3, it was confirmed that the method for making the composite members using the Au—Ag alloy solder material showed an effect to diminish the residual stress at the bonded part and the composite members made by the above method had excellent endurance against high temperature.

As explained above, in the present invention, an Au or Au—Ag alloy solder material is used as the bonding layer, and the bonding layer and the metallic member are bonded by solid phase bonding. Therefore, the composite members of the present invention can be effectively inhibited from breakage of the member caused by residual stress at the time of bonding and, besides, are excellent in thermal cycle characteristics and thermal shock characteristics.

Furthermore, in the case of using the Au—Ag alloy solder material, Ag contained therein prevents diffusion of the metallic elements such as Ni used as the metallic member into the solder material, and thus the composite members have characteristics suitable as members used under high temperature conditions, particularly, members for susceptors for disposing semiconductor wafers. Moreover, even when the metallic members to be bonded comprise Co, Cr, Fe or alloys mainly composed of these metals, the effect to inhibit diffusion thereof due to the addition of Ag to Au can be expected as in the case of the metallic member comprising Ni evaluated in the above examples in view of phase diagrams of Ag—Ni, Ag—Co, Ag—Cr and the like.

In addition, the method for making the composite member according to the present invention is an excellent method which can simply make the composite member having the above-mentioned characteristics through the given steps.

What is claimed is:

1. A composite member comprising different members of a ceramic base and a metallic member bonded to each other, wherein an active metal foil is disposed on the surface of the ceramic base and a solder material comprising Au is disposed directly on the active metal foil, the active metal foil and the solder material are heated to form a bonding layer, the metallic member is disposed on the surface of the bonding layer, and these are pressed and heated to bond the bonding layer and the metallic member through solid phase bonding.

2. A composite member according to claim 1, wherein an electrical conductor comprising Mo, W or an alloy of Mo and W is embedded in the ceramic base so that a part of the surface of the electrical conductor is exposed to the exterior of the ceramic base.

3. A composite member according to claim 1, wherein the material of the ceramic base is at least one material selected from the group consisting of aluminum nitride, silicon nitride, alumina, zirconia, magnesia, spinel and silicon carbide.

4. A composite member according to claim 1, wherein the material of the metallic member is at least one material selected from the group consisting of Ni, Co, Fe and Cr.

5. A composite member according to claim 1, wherein the material of the metallic member is an alloy comprising as a main constituting element at least one material selected from the group consisting of Ni, Co, Fe and Cr.

6. A composite member according to claim 1, wherein the material of the active metal foil is at least one material selected from the group consisting of Ti, Nb, Hf and Zr.

7. A composite member according to claim 1, wherein the composite member is used as a susceptor for disposing a semiconductor wafer.

8. A composite member comprising different members of a ceramic base and a metallic member bonded to each other, wherein an active metal foil is disposed on the surface of the ceramic base and a solder material comprising an Au—Ag alloy is disposed directly on the active metal foil, the active metal foil and the solder material are heated to form a bonding layer, the metallic member is disposed on the surface of the bonding layer, and these are pressed and heated to bond the bonding layer and the metallic member through solid phase bonding.

9. A composite member according to claim 8, wherein the content of Ag in the Au—Ag alloy is 0.5–80 wt %.

10. A composite member, comprising:

a ceramic base;

an electrical conductor comprising Mo, W or an alloy of Mo and W embedded in said ceramic base such that a part of a surface of the electrical conductor is exposed to the exterior of the ceramic base; and a metallic member bonded to the ceramic base, wherein an active metal foil is disposed on the surface of the ceramic base and a solder material comprising Au is disposed on the active metal foil, the active metal foil and the solder material are heated to form a bonding layer, the metallic member is disposed on the surface of the bonding layer, and these are pressed and heated to bond the bonding layer and the metallic member through solid phase bonding.

* * * * *